United States Patent Office 3,264,241
Patented August 2, 1966

3,264,241
URON RESIN-TRIAZONE COMPOSITIONS
David H. Abrahams, New Rochelle, and Leo Goldberg, Bayside, N.Y., assignors to Dexter Chemical Corporation, a corporation of New York
No Drawing. Filed June 19, 1963, Ser. No. 288,911
12 Claims. (Cl. 260—29.4)

This invention relates to a triazone and uron resin composition and to the use thereof for treating textile materials and particularly cellulosic textile materials.

The use of uron resin compositions on textile fabrics for imparting shrinkage control, crease resistance and smooth drying properties is well known. The uron resins are made conventionally by the condensation of urea with formaldehyde to form initially tetramethylol urea. Dehydration of tetramethylol urea, with elimination of one mole of water between two adjacent N,N'-methylol groups, yields a monocyclic N,N'-bis(methylol) ring compound of the formula

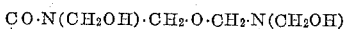

namely, N,N'-bis(methylol) uron. The two methylol groups of N,N'-bis(methylol) uron are then etherified by acidic reaction with an aliphatic alcohol having one to four carbon atoms to yield a diether of the formula

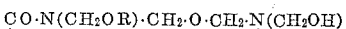

namely, N,N'-bis(alkoxymethyl) uron which is the uron resin in the form used for treatment of textiles conventionally. The preparation of such uron resins is described by Kadowaki (Bull. Chem. Soc. (Japan) 11, 248–61 (1936)), and as used herein the term uron resin is intended to refer to N,N'-bis(alkoxymethyl) urons of the formula given above.

To overcome certain disadvantages experienced in the use of uron resins alone, the art has suggested mixing such resins with melamine formaldehyde condensates, in particular alkylated methylol melamine resins. Textile materials treated with such mixtures of uron and alkylated methylol melamine resins still, however, are prone to loss of tensile strength after repeated laundering or bleachings, and in some instances objectionable discolorations are also experienced.

The present invention provides a composition that when used in a manner similar to the conventional mixture of uron and alkylated methylol melamine resins avoids these problems of loss of strength or yellowing of the fabric under the conditions stated.

Briefly, the invention comprises a novel textile treatment composition consisting of N,N'-bis(alkoxymethyl) uron resin in admixture with a triazone compound and more specifically a dimethylol-tetrahydro-s-triazone-2 substituted in the 5-position with alkyl, alkanol, alkoxyalkyl, cycloalkyl and alkylene groups. Such compositions have been found to yield superior results in the treatment of textile materials and apparently the uron resin and triazone components interact synergistically since together they give results which surpass any results obtained through separate use of each component on textile materials.

In forming the composition of the invention, we use conventional conditions and materials to make the uron resins. For best yields, we use formaldehyde for condensation with urea in the proportion of at least 4 mols to one of the urea. The alkali used in this condensation is ordinarily sodium or potassium hydroxides which are economical and effective. Condensation of the urea and formaldehyde is continued until maximum yield of tetramethylol urea has been obtained and thereafter the mixture is concentrated by vaporization of water at atmospheric or reduced pressure to eliminate one mol of water between adjacent methylol groups and form N,N'-bis(methylol) uron in conventional manner.

Thereafter, an alcohol and acid are added to establish the pH at a suitable level for etherification of the remaining methylol groups on the uron with the alcohol, as for instance addition of sufficient sulfuric, hydrochloric or other acid to reduce the pH to at least about 3.5. The alcohol used for etherification may be any aliphatic alcohol having one to four carbon atoms, for example, methanol, ethanol, propanol, butanol, isopropanol and the like. The etherification reaction may be conducted at temperatures from about room to reflux temperature until no further substantial etherification occurs. Following formation of the N,N'-bis(alkoxymethyl) uron diether, the pH of the product is adjusted to substantially neutral with alkali and then we prefer to evaporate off excess, unconsumed alcohol.

As for the triazone component of the novel textile treatment composition, we use a 5-substituted dimethylol-tetrahydro-s-triazone-2 having the following formula:

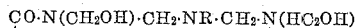

In this formula, R, which represents the substituents at the 5-position, may be any alkyl, alkanol, alkoxyalkyl, cycloalkyl or alkylene group having from one to six carbon atoms. Examples of specific R groups in triazone compounds which may be employed in the novel compositions of the invention are methyl, ethyl, propyl, isopropyl, butyl, tert.-butyl, amyl, hexyl, hydroxyethyl, hydroxypropyl, hydroxybutyl, methoxyethyl, ethoxyethyl, cyclopentyl, cyclohexyl and ethylene, propylene, butylene where the terminal carbon atom of such alkylene groups is attached to the 5-position of a second triazone molecule to form bis-triazones.

The foregoing triazone compounds may be made in conventional manner by condensation of dimethylol urea with the corresponding amine of the R group which is desired to be introduced at the 5-position of the tetrahydrotriazone resulting from the condensation. For example, for introducing R alkyl groups, dimethylol urea is condensed with the corresponding alkyl amine such as methyl, ethyl, propyl amine, etc. For R alkanol and alkoxyalkyl groups, dimethylol urea is condensed with corresponding alkanol and alkoxyalkyl amines such as ethanolamine, propanolamine, methoxyethylamine, ethoxyethylamine, etc. The same type of condensation reaction is employed for introducing cycloalkyl and alkylene groups at the 5-position of the tetrahydrotriazone, in the latter case an alkylene diamine being condensed with two mols of dimethylol urea to form the corresponding bis-tetrahydrotriazone.

Following condensation of dimethylol urea and the R amine, the resulting 5-substituted tetrahydrotriazone is condensed with at least 2 mols of formaldehyde to form the dimethyloltetrahydro-s-triazone-2 which is used in the novel compositions of the invention. This condensation may be effected, in known manner, at an alkaline pH at a temperature of 30° to 100° C. and preferably between about 70° to 100° C.

The selected triazone compound may be mixed with the uron resin in relative weight proportions per 100 parts of the mixture of from about 5 to 80 parts of triazone compound and correspondingly from about 95 to 20 parts of uron resin. Less than about 5 parts of triazone compound is not enough for a beneficial interaction with uron resin in accordance with the invention and more than about 80 parts of the triazone compound is apparently so excessive as to become dominating with respect to the uron resin, so that a beneficial interaction with the latter is not possible and the advantages of the invention not realized.

For most commercial applications we prefer to use about 10 to about 50 parts of triazone compound in mixture with about 90 to about 50 parts of uron resin.

The triazone compound may be mixed with the uron resin either before or after evaporating excess, unconsumed alcohol from the latter following etherification. In one embodiment of the invention, we heat the mixture of the triazone compound with the uron resin to 80° C. for a period of two hours to complete any action, if any, that may occur between the two materials. This heating is not necessary, however, as the simple mixture of the two components namely, the triazone compound and the uron resin, is adequate to give the effects desired in the treatment of the textile materials.

In a commercial operation it is convenient to have water present in the mixture as shipped and as used for application to textiles. This water we may add before the mixing of the triazone compound with the uron resin or after. A usual solution for commercial shipment contains about 40% to 80% of mixed triazone compound and uron resin solids. Such solution may be further diluted to contain as low as about 2.5% of mixed triazone compound and uron resin solids by the ultimate user.

The mixture of triazone compound and uron resin may be applied to textile materials in the conventional manner that is customarily used for uron resins. The mixture is applied and then subjected to drying and curing temperatures, separately or in a combined operation, to develop the properties of shrinkage control, crease resistance and smooth drying. Normally, a temperature range of 180° to 450° F. and heating period of about 1 to 10 minutes are employed. These are satisfactory for applying the novel compositions of the present invention to textile materials.

The invention will be illustrated further by description in connection with the following examples in which proportions are expressed as parts by weight unless specifically stated to the contrary.

*Example 1*

To a mixture containing 2.64 mols of urea and 12.65 mols of formaldehyde was added sufficient sodium hydroxide to bring the pH to 10 and the mixture was then refluxed at atmospheric pressure for about 1 to 1½ hours. At the end of this time, water was stripped from the product under vacuum and the resulting N,N'-bis(dimethylol) uron resin was dissolved in 230 grams (7.2 mols) of methanol. The pH of the alcohol solution was adjusted to 2.5 with sulfuric acid and the solution was agitated for 1 hour at a temperature of 50° C. The sulfuric acid was then neutralized with sodium hydroxide and excess, unconsumed alcohol stripped under vacuum, leaving a substantially anhydrous dimethyl ether of N,N'-bis(dimethylol) uron, (N,N'-bis(methoxymethyl) uron).

1 mol of urea and 2 mols of formaldehyde were mixed in a kettle and the mixture was cooled with ice to a temperature of minus 8 to 0° C. To the resulting mixture of dimethylol urea as well as some unreacted urea and formaldehyde was added 1 mol of ethanolamine over a period of one-half hour and at a controlled temperature to prevent an increase in temperature above 10° C. The resulting mixture was stirred and the temperature thereof maintained at about 23 to 25° C. for a period of 2½ to 3 hours. Then the mixture was heated progressively at 35°, 45° and 55° C. for a period of 1 hour and finally two mols of formaldehyde were added to the mixture and a pH thereof adjusted to 10.5. The mixture was then heated to 80–85° C. and finally cooled and neutralized to approximately 7. The resulting product was dimethylol-5-hydroxyethyl-tetrahydro-s-triazone-2.

75 parts of the uron resin solids and 25 parts of the triazone compound solids, prepared above, were mixed together and sufficient water added to make up a dipping bath suitable for treating cotton fabric. The resin solids in this bath were about 5% by weight. In addition 1% of zinc nitrate catalyst was added to the dipping solution.

A cotton fabric was padded with this dipping solution, dried at 140° F. for 10 minutes and then cured at 340° F. for 1½ minutes. The cured fabric was given five commercial type wash cycles with acid sours, each cycle consisting of three soapy washes in detergent solution, one soaking in conventional water softener, at 140° F., and six rinses in clear water, with zinc silico fluoride acid sour being added to the last rinse. After ironing, the cotton fabric was tested for degradation due to retained chlorine.

Loss in tensile strength because of retained chlorine was measured on a Scott tester according to the standard chlorine retention test "Damage By Retained Chlorine," test No. 92–1962 described on page B–92 of the Technical Manual and Yearbook of the American Association of Textile Chemists and Colorists, 1962 edition, vol. 38.

The warp crease recovery was measured according to the standard test "Wrinkle Recovery Tester Method," test No. 66–1959T described on page B–128 of the above-identified manual.

The results of these tests were as follows:

Crease recovery _____ 126
Percentage loss, tensile strength, percent _____ 23

These results show a considerable improvement over a standard urea formaldehyde textile treatment resin which ordinarily shows a tensile strength loss of 80% under the same test conditions.

*Example 2*

Dipping solutions were made using the uron resin and triazone compound mixture prepared in Example 1 and applied to cotton fabrics in the same manner. The relative proportions of uron resin and triazone compound used in the dipping solutions and the results of warp crease recovery and chlorine degradation determinations, as obtained by the tests described in Example 1 are given in the following table.

| Parts triazone/parts Uron | Crease Recovery | Percentage Loss, Tensile Strength |
|---|---|---|
| 20/80 | 125 | 24 |
| 30/70 | 126 | 19 |
| 50/50 | 124 | 13 |
| 100/0 | 116 | 10 |
| 0/100 | 127 | 42 |

As will be seen, dipping solutions containing mixtures of uron resin and triazone compound in accordance with the invention gave the best overall performance as to the properties that were tested. While 100% triazone gave the least loss in tensile strength, only 10%, the warp crease recovery was also the poorest of all materials tested. 100% uron resin, on the other hand, gave slightly better warp crease recovery than the three blends of uron resin and triazone compound, but the loss in tensile strength for uron resin alone was the highest of materials tested. The three blends of uron resin and triazone compound prepared in acordance with the invention gave a remarkably satisfactory balance in the two tested properties, the warp crease recovery for all three being at an execeptionally high level and the percentage loss in tensile strength being more and more minimized as the proportion of triazone compound in the mixtures increased.

*Example 3*

1 mol of dimethylol urea was condensed with 1 mol of methylamine and the condensate methylolated with 2 mols of formaldehyde in the manner described in Example 1 to form the triazone compound dimethylol-5-methyl-tetrahydro-s-triazone-2. Dipping solutions were made with mixtures of this triazone compound and N,N'-bis (methoxymethyl)uron resin and cotton fabrics treated and tested with the methods used in Example 1. The results were as follows:

| Parts triazone/parts Uron | Crease Recovery | Percentage Loss, Tensile Strength |
|---|---|---|
| 20/80 | 125 | 21 |
| 40/60 | 124 | 14 |

Example 4

Example 3 was repeated except that dimethylol urea was condensed with ethylamine to form the triazone compound dimethylol-5-ethyl-tetrahydro-s-triazone-2. The results of the performance tests were as follows:

| Parts triazone/parts Uron | Crease Recovery | Percentage Loss, Tensile Strength |
|---|---|---|
| 20/80 | 127 | 24 |
| 40/60 | 123 | 15 |

Example 5

Two mols of dimethylol urea were condensed with 1 mol of ethylene diamine and the condensate methylolated with 4 mols of formaldehyde in the manner described in Example 1 to form the bis-triazone compound 1,2-bis(3,5-dimethylol-2,6-tetrahydro-s-triazone-4-yl) ethylene having the formula (CH$_2$·N(CH$_2$OH)·CO·N(CH$_2$OH)·CH$_2$·N—)$_2$C$_2$H$_4$ Dipping solutions containing mixtures of this triazone compound and N,N'-bis(methoxymethyl) uron resin were prepared and cotton fabrics treated with the same as in Example 1. The results of performance tests were as follows:

| Parts triazone/parts Uron | Crease Recovery | Percentage Loss, Tensile Strength |
|---|---|---|
| 25/75 | 127 | 14 |
| 50/50 | 124 | 9 |

Example 6

1 mol of dimethylol urea was condensed with 1 mol of cyclohexylamine and the condensate methylolated with 2 mols of formaldehyde in the manner described in Example 1 to form the triazone compound dimethylol-5-cyclohexyl-tetrahydro-s-triazone-2. A dipping solution containing 30 parts of this triazone compound and 70 parts of N,N'-bis(methoxymethyl) uron resin was applied and cured to cotton fabric as in Example 1. The results of the performance tests showed that the treated fabric had a warp crease recovery of 123 and a loss in tensile strength of 21%.

Example 7

1 mol of dimethylol urea was condensed with 1 mol of isopropanol amine and the condensate methylolated with 2 mols of formaldehyde in the manner described in Example 1 to form the triazone compound dimethylol-5-hydroxyisopropyl-tetrahydro-s-triazone-2. A dipping solution containing 40 parts of this triazone compound and 60 parts of N,N'-bis(methoxymethyl) uron resin was applied and cured to fabric as in Example 1. The results of the performance tests showed that the treated fabric had a warp crease recovery of 125 and a loss in tensile strength of 15%.

Example 8

1 mol of dimethylol urea was condensed with 1 mol of ethanol amine and the condensate methylolated with 2 mols of formaldehyde in the manner described in Example 1 to form the triazone compound dimethylol-5-hydroxyethyl-tetrahydro-s-triazone-2. A dipping solution containing a mixture of 10 parts of this triazone compound and 90 parts of N,N'-bis(methoxymethyl) uron resin was applied and cured to fabric as in Example 1. The same was done as a control with another dipping solution containing only the N,N'-bis(methoxymethyl) uron resin.

The cured fabrics were given ten washes in boiling soap solution in accordance with the test "Dimensional Changes in Laundering of Woven and Knitted Textiles, Except Wool," test No. 96–1960T, test IV–B, described on pages B95–98 of The Technical Manual of the American Association of Textile Chemists and Colorists, 1962 edition, vol. 38.

Following these washes, the loss in tensile strength of both was determined according to the standard chlorine retention test described in Example 1. The results showed that the fabric bearing the uron resin alone lost 35% of its initial tensile strength whereas the fabric containing the mixture of uron resin and triazone compound lost only 16% of its initial tensile strength.

Example 9

Example 8 is repeated except that the dimethylol urea is condensed with 1 mol of methoxyethyl amine to form the triazone compound dimethylol-5-methoxyethyl-tetrahydro-s-triazone-2.

The results of the performance tests are substantially the same as described in Example 8.

In place of the alkoxyalkyl amine used in the preceding example, acetoxyalkyl amines having from one to six carbon atoms in which the hydroxy group of the alkanol radical has been esterified may be employed to form triazone compounds for mixture with uron resin in accordance with the invention.

It will be understood that it is intended to cover all changes and modification of the preferred embodiments of the invention, herein chosen for the purpose of illustration, which do not constitute departures from the spirit and scope of the invention.

We claim:

1. A composition for treatment of textile fabric consisting essentially of from about 95 to about 20 parts of a N,N'-bis(alkoxymethyl) uron resin and from about 5 to about 80 parts of a triazone compound having the formula:

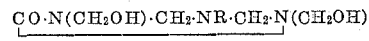

wherein R is selected from the group consisting of alkyl, alkanol, alkoxyalkyl, cycloalkyl and alkylene radicals having from one to six carbon atoms.

2. A composition as in claim 1 in aqueous solution, said solution containing from 2.5% to about 80% by weight of mixed uron resin and triazone compound solids.

3. A composition as in claim 1 in which R is an alkyl radical.

4. A composition as in claim 1 in which R is an alkanol radical.

5. A composition as in claim 1 in which R is a cycloalkyl radical.

6. A composition as in claim 1 in which R is an alkylene radical.

7. A composition as in claim 1 in which R is an alkoxyalkyl radical.

8. A composition for treatment of textile fabric consisting essentially of from about 95 to about 20 parts of a N,N'-bis(alkoxymethyl) uron resin and from about 5 to about 80 parts of a triazone compound having the formula:

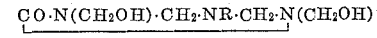

whehein R is an acetoxyalkyl radical having from one to six carbon atoms.

9. An article of manufacture comprising a textile fabric modified by the composition of claim 1.

10. A process for treating a textile fabric which comprises applying to the fabric a mixture consisting essentially of from about 95 to about 20 parts of a N,N'-bis(alkoxymethyl) uron resin and from about 5 to about 80 parts of a triazone compound having the formula:

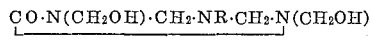

wherein R is selected from the group consisting of alkyl, alkanol, alkoxyalkyl, cycloalkyl and alkylene radicals having from one to six carbon atoms, and drying and curing said applied mixture on the fabric.

11. A process as in claim 10 in which said applied mixture is dried at a temperature of from about 180° to 450° F.

12. A process for treating a textile fabric which comprises applying to the fabric a mixture consisting essentially of from about 95 to about 20 parts of a N,N'-bis(alkoxymethyl) uron resin and from about 5 to about 80 parts of a triazone compound having the formula:

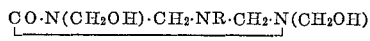

wherein R is an acetoxyalkyl radical having from one to six carbon atoms, and drying and curing said applied mixture on the fabric.

References Cited by the Examiner

UNITED STATES PATENTS

| | | | |
|---|---|---|---|
| 2,373,135 | 4/1945 | Maxwell | 260—850 |
| 3,043,718 | 7/1962 | Hurwitz | 260—849 |
| 3,058,847 | 10/1962 | Whitesides | 260—849 |
| 3,063,869 | 11/1962 | Roth | 260—849 |

MURRAY TILLMAN, *Primary Examiner.*

J. C. BLEUTGE, *Assistant Examiner.*